United States Patent [19]

Edo

[11] 4,015,269
[45] Mar. 29, 1977

[54] AUTOMATIC PENCIL APPARATUS FOR AN AUTOMATED DRAFTING SYSTEM

[75] Inventor: Tsukasa Edo, Narashino, Japan

[73] Assignee: Kabushiki Kaisha Daini Seikosha, Japan

[22] Filed: July 17, 1975

[21] Appl. No.: 596,606

[30] Foreign Application Priority Data

July 26, 1974 Japan .............................. 49-85896

[52] U.S. Cl. ............................ 346/139 C; 33/18 R; 401/65
[51] Int. Cl.² ...................................... G01D 15/24
[58] Field of Search .......... 346/139 C; 401/67, 65; 33/18 R, 18 B

[56] References Cited

UNITED STATES PATENTS

| | | | |
|---|---|---|---|
| 3,293,658 | 12/1966 | Sicking | 346/139 R |
| 3,345,640 | 10/1967 | Sicking | 346/139 R |
| 3,541,579 | 11/1970 | Von Hippel | 346/139 C |
| 3,857,525 | 12/1974 | Gerber et al. | 346/139 C X |

Primary Examiner—Joseph W. Hartary
Attorney, Agent, or Firm—Robert E. Burns; Emmanuel J. Lobato; Bruce L. Adams

[57] ABSTRACT

An automatic pencil apparatus for use with an automated drafting system comprises a gripping mechanism for releasably gripping a lead and comprised of a cylindrical tube, and a collet mounted for longitudinal movement in the tube for gripping and releasing the lead. A driving mechanism including an electromagnet selectively drives the gripping mechanism to actuate the collet and release the lead so that a drawing operation can be carried out. A pneumatic cylinder applies a predetermined constant pressure to the lead while in its released state thereby pressing the lead into contact with a drafting paper under constant pressure so that high quality lines can be drawn throughout consumption of the lead and independent of lead wear.

6 Claims, 1 Drawing Figure

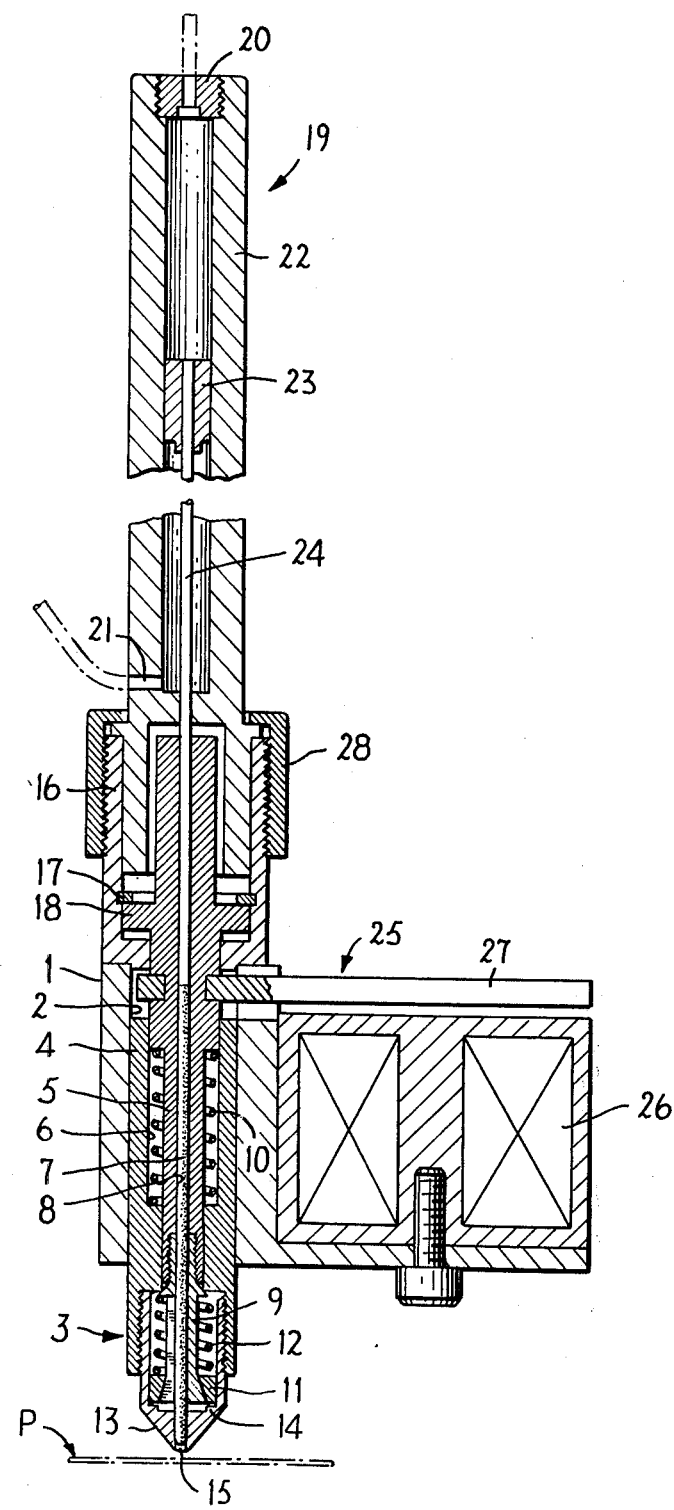

AUTOMATIC PENCIL APPARATUS FOR AN AUTOMATED DRAFTING SYSTEM

BACKGROUND AND SUMMARY OF THE INVENTION

This invention relates to an automatic pencil apparatus for an automated drafting system.

Recently, some companies have developed the automated drafting system, in which a drafting head driven by the linear pulse motor or a like runs on the drafting paper so as to plot drawings and symbols. Such a drafting system is currently available for practical use.

For these automated drafting systems, drawings were frequently desired to be drawn using pencil lead as the drawing medium to provide erasable drawings. However, there has not heretofore been developed a suitable mechanism which gives the optimum pressure on the lead so as to plot smoothly on the paper and enables the lead to be removed at the end of drawing lines, and which can slide the leads succesively in response to the abrasion of lead.

This invention aims to solve the above problems by providing an apparatus having a gripping mechanism which holds the lead and lifts it up to a predetermined height, the gripper driving mechanism which actuates the gripper to hold and lift the lead and to release the lead, and a pressing mechanism which gives constant downward pressure on the lead. In the apparatus of the present invention, when the gripping mechanism releases the lead, the tip of the lead touches the paper under a predetermined pressure determined by the pressing mechanism, independently of the abrasion of lead. On the other hand, when the gripping mechanism holds and lifts up the lead, the apparatus according to the present invention enables the lead to be removed from the paper.

BRIEF DESCRIPTION OF THE DRAWING

For a more complete understanding of this invention reference may be had to the accompanying drawing, which is a cross sectional view of the apparatus according to the present invention.

DETAILED DESCRIPTION OF THE PREFERRED EMBODIMENT:

Referring now to the drawing, an attaching frame 1, which extends from a drafting head of the automated drafting system which is not shown, has a through hole 2, in which a cylindrical tube 4 of a gripping mechanism 3 is inserted. In the cylindrical tube 4, a guide member 5 for a lead 7 is vertically slidably inserted in an inner cylinder 6. In the center of this guide 5, a guide hole 8 is formed so as to hold the lead 7 slidably upward and downward. In addition, on the lowest end of guide 5, an actuatable collet 9 is screwed. As shown in the drawing, the guide 5 is always pressed upward by a spring 10 which is mounted in the upper hollow of said inner cylinder.

The inner face of a tapered ring 11 which surrounds said collet 9 is chamfered toward the lower end so as to fit on the lower projection of the collet 9. This tapered ring 11 is always pressed downward, i.e. to fasten the lead, by a spring 12 which is mounted in the lower hollow of said inner cylinder 6. A cover 13 screwed in the lower end of the cylindrical tube 4 covers completely said collet 9 and the tapered ring 11 and the lowest position of the ring is limited by a stopper 14 formed on the bottom of the cover 13. In the center of the cover 13, there is an aperture 15 through which penetrates the lead 7 inserted slidably in said guide 5. The upper portion of the guide 5 protrudes beyond the upper end of the attaching frame 1 and this protruding portion is surrounded with the upper cylindrical portion 16 of the tube 4. On the inner wall of the cylindrical portion 16 is a ring-shaped stopper 17 fixed, so as to limit the highest position of the guide 5, in other words, to define the highest limit of the collet 9. When the flange 18 on guide 5 touches with the stopper 17, the guide 5 can not move further upward.

The pressing means 19 consisiting of a pneumatic cylinder 22 has an upper opening 20 and a lower opening 21 respectively on the upper and lower ends. The cylinder 22 is screwed in the upper portion of said cylindrical portion 16 with a box nut 28. A pushing rod 24 fixed on a piston 23 in the cylinder 22 protrudes beyond the lower end of cylinder 22 and extends into a guide hole 8 of said guide 5.

A gripper driving means 25 is provided actuating the above-mentioned gripping mechanism 3 and consists of an electromagnet 26 mounted on the attaching frame 1, and a plate 27 which is mounted on the side wall of the guide 5 and spaced from and extending over said electromagnet 26. When the electromagnet 26 is energized, the plate 27 is attracted to the magnet 26, so as to slide the guide 5 downward against the pressure exerted by the spring 10.

The operation of the above mentioned embodiment according to the present invention will be described hereinafter.

The complete apparatus according to the present invention is supported on the attaching frame 1 extended from the drafting head of automated drafting systems, so as to space a predetermined gap between the drafting paper P spread on the table and the tip of the cover 13. For initially inserting the lead into the apparatus, the cylinder 22 of pressing means 19 is removed from the cylindrical portion 16. After inserting the lead into the guide hole 8 of guide 5, the pushing rod 24 is inserted into the hole 8 and then the cylinder 22 is attached onto the cylindrical portion 16.

When the electromagnet 26 is not excited, the guide 5 and the collet 9 attached to it are pressed to the upper limit by means of the spring 10, thereby the tapered ring 11 forces the collet 9 to close by means of the spring 12.

When the electromagnet 26 is excited, the magnet 26 attracts the plate 27 and consequently the guide 5 and the collet 9 move downward. Simultaneously when the collet 9 moves down, the tapered ring 11 touches with the stopper 14. When the collet 9 goes further down, the tapered ring 11 releases the collet 9 so as to open it.

In the above-mentioned condition, when predetermined pnuematic pressure is applied in the upper chamber of cylinder 22, the pneumatic pressure is consequently applied on the upper end of the lead 7 through the piston 23 and pushing rod 24. Thus the lower end of the lead 7 protrudes from the aperture 15 in cover 13 so as to contact the drafting paper P under the predetermined pressure. The apparatus according to the present invention is enabled here to draft and plot, where the lead 7 is consecutively slidden out in response to the abrasion and wear of the lead.

In case of stopping or pausing of drafting or plotting, the electromagnet 26 is deenergized so that the lead 7 is lifted up from the paper P. The plate 27 does not receive the attracting force and accordingly the guide 5 and the collet 9 are lifted up to the upper position. In the lifting movement of the collet 9, the tapered ring 11 at the lower position is engaged with the collet 9 so as to close the collet 9 and to hold and lift the lead 7 to the upper position. When the above-mentioned movement of pressing and lifting up of lead on the drafting paper P is repeatedly performed, the required drafting and plotting can be complete.

The pressing means 19 in the above embodiment is described to consist of the pnuematic cylinder. It is to be, however, understood that the invention is not limited to the precise embodiment described above and that minor modifications applying such as hydraulic cylinders or spring mechanism, or rack and pinion mechanism may be made within the scope of the invention. It is also to be understood as to the gripping mechanism 3 and to the gripper driving means 25 including the collet chuck and the electromagnet that minor modification may be made within the scope of the present invention.

As apparently understood from the above description, the apparatus according to the invention is constructed so as to apply a predetermined fixed pressure on the lead, and consequently the fixed drafting pressure can be applied independently of the abrasion or wear of the lead to draft or plot in the high quality lines with uniform thickness.

In addition, the lead is automatically slidden out so that long drafting or plotting is enabled. Moreover, the body of the apparatus does not move up and down, while only the lead goes up and down to make or break contact with the paper, so that the merit such as the higher responding rate of motion can be attained.

What I claim is:

1. An automatic pencil apparatus for use with an automated drafting system comprising: gripping means for gripping and releasing a lead during use of the apparatus, said gripping means including an actuatable collet slidably receiving therethrough the lead and operable when actuated to release the lead and when not actuated to releasably grip the lead, and means for normally biasing said collet to its non-actuated state; driving means for selectively driving said gripping means to thereby automatically actuate said collet to effect release of the lead; and pressing means for exerting a constant pressure on the lead while it is released from said collet to thereby press the lead into contact with a drafting paper under constant pressure, said pressing means including a slidably mounted rod having one end in contact with the lead, and means for applying constant pressure to the other end of said rod so that said rod presses the lead under constant pressure into contact with the drafting paper.

2. An automatic pencil apparatus according to claim 1; wherein said gripping means includes a cylindrical tube, a tubular guide member mounted for sliding movement within said cylindrical tube and having a longitudinal guide hole extending therethrough from the upper end thereof to the lower end thereof for slidably receiving the lead, means connecting said collet to said lower end of said tubular guide member, and wherein said rod slidably extends into said longitudinal guide hole from said upper end of said tubular guide member so that said tubular guide member guides both said rod and the lead thereby preventing bending of said rod while said constant pressure is applied thereto.

3. An automatic pencil apparatus according to claim 2; wherein said pressing means comprises a pneumatic cylinder having a slideable piston, and means connecting said rod to said piston for sliding movement therewith.

4. An automatic pencil apparatus according to claim 2; further including a frame having fixedly mounted thereon said cylindrical tube; and wherein said driving means comprises means connected to said tubular guide member for sliding it relative to said cylindrical tube to thereby automatically actuate said collet to effect release of the lead.

5. An automatic pencil apparatus according to claim 4; wherein said driving means includes an electromagnet operative when energized to overcome the normal biasing of said collet to its non-actuated state to effect sliding of said tubular guide member to thereby actuate said collet.

6. An automatic pencil apparatus according to claim 4; including means for limiting the sliding movement of said tubular guide member.

* * * * *